Sept. 28, 1954  D. V. MOSES ET AL  2,690,425
WASTE DISPOSAL PROCESS
Filed March 23, 1950
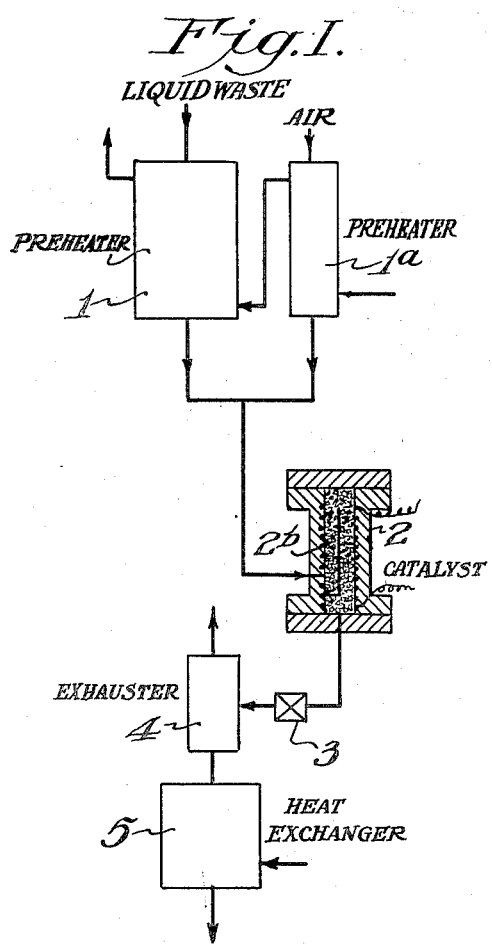
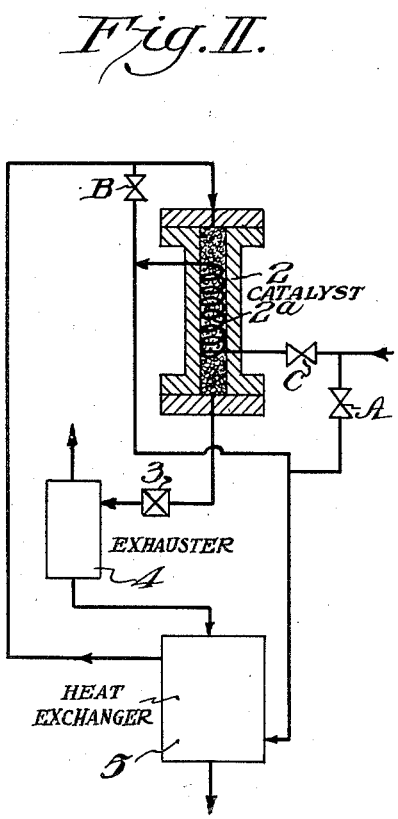
INVENTORS
DOUGLAS V. MOSES and
ELGENE A. SMITH
BY
ATTORNEY

Patented Sept. 28, 1954

2,690,425

UNITED STATES PATENT OFFICE 2,690,425

WASTE DISPOSAL PROCESS

Douglas V. Moses, Charleston, W. Va., and Elgene A. Smith, Havertown, Pa., assignors to E. I. du Pont de Nemours & Company, Wilmington, Del., a corporation of Delaware Application March 23, 1950, Serial No. 151,424

1 Claim. (Cl. 210—2)

This invention relates to the disposal of industrial wastes of an organic nature and more particularly relates to the destructive catalytic oxidation of such wastes to permit their economical disposal, to abate stream pollution, to inhibit stream contamination and to otherwise eliminate industrial and health problems associated therewith.

Extended investigations of the various types of fluid wastes and the development of methods for treating them are becoming more extensive because of public concern over polluted streams. Coagulants, precipitating agents, settling beds, biological processes, and other expedients are in use to lower the chemical oxygen demand of liquid waste materials.

Biological methods of treatment are widely used on domestic sewage and to some extent on industrial wastes. One form of treatment comprises the intermittent spraying of clarified organic waste material on beds of stones coated with adhering bacterial slime. The bacteria feed on and thus destroy the organic matter. In another form of treatment air is passed through retention tanks in which the waste, containing suspended recovered bacterial accumulations in the form of sludge, is exposed. Both methods suffer from inherent disadvantages. The capacity per unit of volume is low so that the capital investment and ground area required are great. Of greater importance, however, is the limitation imposed by toxicity to the bacterial growth of many waste materials. Toxicity may be due to the nature of the materials to be treated or, in some cases, to their concentration. A notable example of the effect of concentration occurs in the treatment of wastes containing phenol. Concentrations in the range below 40 p. p. m. serve as bacterial foods while concentrations of above 200 p. p. m. are bactericides and result in killing the accumulated active bacteria requiring the cultivation of a new growth.

Due to the increasing density of population concurrently with the demand for pure and palatable water, the problem of properly treating industrial wastes prior to discharging them into natural streams is becoming increasingly important.

An object of the present invention is to provide a process for the treatment of industrial organic liquid waste materials. Yet another object of the invention is to provide a process for the destructive oxidation of organic materials present in factory effluent whereby the chemical oxygen demand (C. O. D.) can be lowered to an insignificant amount. Still another object of the invention is to provide a process for the destructive catalytic oxidation of organic wastes. A further object is to provide methods, conditions and catalysts by means of which wastes containing liquid organic materials can be subjected to liquid phase destructive catalytic oxidation. Other objects and advantages of the invention will hereinafter appear.

Liquid organic wastes in accord with the process of the invention are mixed with air, oxygen, oxygen-fortified air, or a compound that will give up oxygen under the hereinafter specified conditions, and the mixture passed, in the liquid phase, over a suitable oxidation catalyst under conditions that destructively oxidize the waste material whereby the organic material is destroyed and rendered harmless. This destructive catalytic oxidation process makes it possible to lower the C. O. D. of vaporizable plant effluent from 15,000 or more to substantially zero.

The process of the invention is particularly applicable to the destructive catalytic oxidation of organic materials from chemical plants, distilleries, smelters and industrial operations generally that have effluent from any source, all or part of the C. O. D. of which is due to organic substances. It is applicable, for example, in the treatment of the effluent obtained in the manufacture of formaldehyde by catalytic oxidation of methanol with air. In the production of industrial alcohol by fermentation, the alcohol fraction is distilled from the beer slops and rectified in suitable distillation columns to remove fusel oils and by-product substances of high volatility. The materials of greater volatility than the alcohol, including aldehydes and ethers are discharged overhead and may be drawn off as a liquid or as a vapor. The fusel oils are steam distilled in a subsequent column and may be conveniently removed as a mixture of water and organic vapor. Both of these materials have a relatively high chemical oxygen demand and consequently constitute troublesome wastes of a type not economically susceptible to known treament methods. The process of this invention is directed particularly to the disposition of such wastes. Furthermore, in the chemical industries, and particularly in those operating organic synthesis processes, a number of waste disposal problems dealing with organic materials are encountered that cannot economically or efficiently be disposed of by precipitation, coagulation or other heretofore known means. Moreover, the C. O. D. of many such materials is excessive with the result that they cannot be discharged into streams without developing septic conditions.

The invention of the instant case is directed particularly to the treatment of organic wastes of high toxicity and high C. O. D. value and especially to wastes containing some compounds as for example: the aliphatic and aromatic carboxylic acids; formic, acetic, propionic, butyric acids; the alcohols; methanol, ethanol, propanol and butanol; the aldehydes; formaldehyde, acetaldehyde and propionaldehyde; the lower alkyl esters of the aforesaid and other acids: methyl acetate, ethyl acetate, propyl acetate, methyl formate, ethyl formate, propyl formate and the higher molecular weight vaporizable esters; as well as liquid hydrocarbons or solutions containing volatile hydrocarbons of the saturated and unsaturated series such as the liquid olefins; the ketones such as acetone and such chemicals as: the polyhydric alcohols, dibasic acids, cyanogen compounds, amines, amides, carbohydrates, and in fact all aliphatic, aromatic or mixtures of aliphatic and aromatic compounds. It has been found that when these materials are passed at a temperature between 100° C. and 350° C. under a pressure between 400 and 2500 lbs./sq. in. and through a suitable oxidation catalyst with a sufficient amount of oxygen or oxidizing agent stoichiometrically to react destructively with the organic compound, the compound is completely converted to oxidation products with the simultaneous destruction of the C. O. D. and toxicity.

Methods of practicing the invention will be more readily understood by reference to the drawings in which like parts are designated by like numbers throughout, the drawings illustrating diagrammatically processes of a continuous nature for the destructive catalytic oxidation of organic materials, Figure I illustrating one embodiment of such a process, Figure II a second embodiment. In Figure I, air is passed through preheater 1A and a contaminated liquid waste is passed through preheater 1 in which preheaters the temperatures of the air and liquid waste are raised to a temperature of catalytic destructive oxidation. From these preheaters the waste and air is mixed and the mixture is passed directly into the catalyst, disposed in a pressure resisting vessel 2 which is preferably provided with electrical heating means and may be a single or multiple bed, the multiple beds being disposed in parallel or series to permit respectively similar passage of the solution through them. The bed or beds are preferably baffled, as shown by baffler 2b, to insure intimate contact between the waste and the catalyst. From reactor 2 the oxidation products are passed through let-down valve 3 into the exhauster 4 for removal of the air or volatile products of the oxidation. The gas-free oxidized waste is then passed through heat exchanger 5 from which the liquid oxidation products are discharged to the sewer.

A surprising aspect of the process has been the high exothermicity of the decomposition of waste although it may contain relatively small amounts of organics. Care must be exercised to control the reaction temperature in order, inter alia, to prevent overheating and to avoid lowering the activity of the catalyst. This may be accomplished for example, by passing steam or water directly into the catalyst bed, or by passing the fluid waste material directly into the catalyst bed without preheating or by passing proportions of both into the bed to provide optimum reaction temperatures.

Moreover, the exothermic heat may be used in improving the efficiency of the process. One method of utilizing the heat of reaction is illustrated by Figure II. In this figure the fluid waste and oxygen mixture may be passed through valves A and B directly into the catalyst chamber 2 (valve C being closed), the mixture may be passed through valve A and through the heat exchanger 5 and then into the catalyst chamber 2 (valve B and valve C being closed), or the mixture may be passed by a split-flow partly through valve A and partly through valve B into the catalyst chamber 2 (valve C being closed), the heat from the reaction in the second and third cases being regulated to preheat the waste fluid to catalytic decomposition temperatures.

If desired, the waste fluid and oxygen mixture may be first passed in heat exchange relationship with the catalyst bed e. g. through the tubes 2a imbedded in the catalyst prior to being passed directly into the catalyst chamber 2 (the flow being through valves C and B only) or indirectly by way of the heat exchanger 5 into the catalyst chamber 2 (the flow being through valve C, valves A and B being closed). The oxidation products, as in Figure I, pass from the reactor 2 through let-down valve 3, exhauster 4 and heat exchanger 5 to the sewer. Other flow combinations to satisfy given conditions may be used.

Inasmuch as the invention involves not only process details by which the destructive catalytic oxidation can be carried out but also chemical reactions by means of which the organic material is destructively oxidized, examples are given in which the latter embodiments of the invention are illustrated. In the examples, parts are by weight unless otherwise stated.

*Example 1.*—Twenty-five parts by weight of an aqueous effluent containing 1.21% formic acid by weight, and 188 parts of oxygen were heated to 135° C. and passed through 50 parts of a manganese/chromium/zinc (80/47/20) catalyst at the same temperature with a space velocity of about 60 based on the cubic feet of aqueous waste flowing per hour per cubic feet of catalyst. From an analysis of the product gases for $CO_2$ it was determined that a 68% decomposition of the formic acid resulted.

As a parallel example, the original solution was examined for C. O. D., as measured by reduction of potassium dichromate, and had a demand of 4640 parts per million. The catalytically treated condensate had an oxygen demand of 94 parts per million indicating a decomposition of 98%.

*Example 2.*—Seventy-five parts by weight of an aqueous solution containing 1% formic acid by weight, 4.3 parts of oxygen and 0.3 parts of air was reacted in the presence of an ammonium vanadate catalyst at a temperature between 197 and 205° C. and under a pressure between 200 and 600 lbs./sq. in. The off gas produced as a result of this oxidation reaction analyzed 9.7% $CO_2$, the weight percent of carbon in the original liquid was 0.27 and the weight percent of carbon in the product was 0.047. Upon calculation and from the off gas analysis 95% of the formic acid had been oxidized and from the liquid analysis 84% had been oxidized.

*Example 3.*—Seventy-five parts by weight of an aqueous solution containing 1% formic acid by weight, 4.3 parts of oxygen and 0.3 part of air was reacted in an ammonium vanadate catalyst at a temperature of 200° C. with a pressure between 200 and 600 lbs./sq. in. gauge. The off gas from this reaction analyzed 8.5 to 8.9% carbon dioxide which, upon calculation, indicated that about 79% of the formic acid had been oxidized. In a duplicate run and by gravimetric analysis of the carbon content of the liquid, in the final oxidized product, the formic acid was destructively oxidized to the extent of 93.6%.

*Example 4.*—Seventy-five parts by weight of a 1% aqueous solution of formic acid, 4.3 parts of oxygen and 0.3 part by weight of air was passed over a manganese/chromium/zinc (80/47/20) catalyst at a temperature of about 200° C. and under a pressure between 200 and 600 lbs./sq. in. The percent carbon in the liquid introduced was 0.27. The percent carbon in the liquid discharged from the reaction was 0.007, indicating that 97% of the formic acid had been oxidized.

*Example 5.*—The process of Example 4 was repeated except that manganese sulfate was employed as the catalyst and with this catalyst 84.5% of the formic acid was oxidized.

*Example 6.*—Seventy-five parts by weight of an aqueous solution containing about 1% methanol together with 4.3 parts of oxygen and 0.3 part by weight of air was reacted at a temperature of 200° C. and a pressure of about 200 to 600 lbs./sq. in. gauge in the catalyst of Example 4. The carbon analysis of the liquid indicated 64% of the methanol was destructively oxidized.

Chemical oxygen demand (C. O. D.) units are in parts per million of oxygen by weight determined in accord with the approved method of the Stream Sanitation Office of the United States Public Health Service. The procedure here described should be followed exactly:

A. *Reagents*

Dilute 250 ml. of concentrated $H_2SO_4$ (sp. gr. 1.83–1.84) with an equal volume of distilled water.

Potassium dichromate, 12.2590 grams per liter. This is a primary standard.

Ferrous ammonium sulfate, $Fe(NH_4)_2 6H_2O$, 98 grams per liter. This solution must be standardized daily against the dichromate primary standard.

Orthophenanthroline indicator solution. The orthophenanthroline indicator solution is an 0.25 molar orthophenanthroline ferrous complex which may be prepared by dissolving 3.7125 g. of orthophenanthroline dye and 1.7375 gr. of $FeSO_4.7H_2O$ in 250 ml. of distilled water.

B. *Procedure*

To 100 ml. (or less) of the sample add 20 ml. of the dichromate and 20 ml. of the diluted sulfuric acid. If less than 100 ml. of sample has been used make up to a final volume of 150 ml. with distilled water. Boil one hour on a hot plate, but do not permit the temperature of the sample to rise above 110° C. at any time. Cool and transfer to a 600 ml. beaker, dilute to 300 ml. and titrate with the $FeSO_4$ solution using O-phenanthroline for an indicator.

$$\frac{\text{Net cc. } K_2Cr_2O_7 + 200}{\text{cc. sample}} = \text{p. p. m. of oxygen (C. O. D.)}$$

From the foregoing it will be appreciated that the process of the invention can be employed for the destructive catalytic oxidation of organic wastes generally, and is particularly applicable to organic wastes containing organic compounds present in amounts which are so low in concentration, so contaminated with other materials, or so heterogeneous in composition that they are uneconomical to recover. Ordinarily the concentration of the organic constituent in water is 5% of the organic compound or less, although in some instances much higher concentrations up to 15 or 35% are treated to destructive catalytic oxidation in accord with the process of the invention.

Continued successful operation of the process turns, to a large extent, on the type of oxidation catalyst employed. For this purpose, accordingly, a rugged catalyst that will maintain a high degree of activity over a long period of time should be used.

Metallic oxides may be used, under the temperature conditions herein specified, including, for example, the oxides of copper, nickel, cobalt, chromium, manganese, platinum, palladium, iron cerium, silver or mixtures thereof. All suitable oxidation catalysts may be used. Particularly efficient catalyst mixtures include manganese, zinc, chromium (80/20/47 parts by weight); copper oxide and zinc oxide (1/2 by weight); copper oxide, chromium oxide and magnesium chromate (1/1/.004 by weight); and a mixture of nickel oxide and nickel chromate (1/1 by weight) which catalysts have given 80 to 100% destructive oxidation at temperatures between 50 and 350° C.

The temperature for the complete destructive decomposition of the effluent may range from 50° to 350° C., the temperature of the oxidation being determined, inter alia, by the particular organic compound decomposed and the degree of activity of the catalyst used. Pressures, of course, will be determined by the temperature required and by the composition of the waste material being oxidized, the composite vapor pressures of the constituents by and large governing the total pressure. Any suitable means may be used to control the temperature, e. g. by: the use of thin catalyst beds, say 2″ to 6″ thick, the liquid waste being passed through a plurality of such beds in series with or without cooling means between the beds; high space velocities; injection of a coolant such as water or wet steam directly into the catalyst bed, etc. The preferred catalyst is a mixture of manganese, zinc and chromium and is employed at temperatures ranging between 120° and 300° C. although temperatures outside this range may be used in certain instances to lower the C. O. D. or completely destroy the toxicity of the waste being destructively oxidized. In using this catalyst for oxidizing wastes containing methanol, formaldehyde, formic acids or mixtures thereof a temperature between 125 and 200° C. should be used. For oxidizing wastes containing acetic acid, methyl acetate and benzene, these temperatures should be 200 to 300° C.

Various methods may be used for providing intimate contact between the waste material, oxygen and the catalyst, e. g. the liquid waste and oxygen mixture may be passed through a solid catalyst, a water soluble catalyst dissolved in the mixture, a water insoluble catalyst slurried with the mixture or any other suitable method employed to insure adequate contact.

The space velocity likewise will vary in accord with the amount and type of the organic constituent present in the vapors, generally however it may range between 10 and 2,000 with a preferred range between 25–250 based on the cubic feet of aqueous waste flowing per hour per cubic feet of the catalyst.

The ratio of air to the organic materials present in the waste being destructively oxidized, should be calculated to give a stoichiometrical excess of oxygen over and above that necessary to convert the organic materials present in the waste to so-called permanent gases, that is the contained carbon and hydrogen to carbon dioxide and water, sulfur to sulfur dioxide, or sulfur trioxide, nitrogen compounds to nitrogen, etc.

The wide applicability of the process of the instant case is apparent to those familiar with waste disposal problems. Moreover, the ever increasing load being placed on public water-treating facilities and the demand for better and more palatable water, the damage inflicted on owners of riparian rights by the discharge of wastes into water used by them, the decreasing recreational and health value of lakes and streams and the deterioration of water used for industrial purposes indicate the wide applicability of the destructive oxidation process of the invention for liquid wastes and this is coupled with the utility of the process for the treatment of gases containing organic toxic vapors.

We claim:

In a continuous process for the treatment of liquid factory waste having not more than 5% of an organic compound contaminant and a chemical oxygen demand of more than 40 p. p. m. and less than 15,000 p. p. m., in which oxygen is continuously mixed with the liquid waste in amounts at least sufficient to oxidize stoichiometrically the contaminants present to carbon dioxide and water, and thereafter catalytically oxidizing the said waste by passing it in direct contact with a solid oxidation catalyst, the steps which comprise effecting the continuous oxidation of the factory waste material by passing it in the liquid phase through a solid catalyst of manganese-zinc-chromium (80/20/47 parts by weight) at a temperature between 100° and 350° C. and at a pressure between 200 and 2400 lbs./sq. in.

References Cited in the file of this patent

UNITED STATES PATENTS

| Number | Name | Date |
| --- | --- | --- |
| 1,149,420 | Strehlenert | Aug. 10, 1915 |
| 1,268,774 | Soraas | June 4, 1918 |
| 1,797,426 | Larson | Mar. 24, 1931 |
| 1,914,557 | Craver | June 20, 1933 |
| 1,967,916 | Urbain | June 24, 1934 |
| 2,091,800 | Adkins et al. | Aug. 31, 1937 |
| 2,122,786 | Tropsch | July 5, 1938 |

OTHER REFERENCES

Shreve: The Chemical Process Industries, published 1945 by McGraw-Hill Book Co., Inc., New York, page 917 cited.